United States Patent
Miyawaki

(10) Patent No.: US 10,359,758 B2
(45) Date of Patent: Jul. 23, 2019

(54) TOOL INFORMATION READ/WRITE DEVICE AND MACHINE TOOL HAVING THE SAME

(71) Applicant: FANUC Corporation, Yamanashi (JP)

(72) Inventor: Masanao Miyawaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 734 days.

(21) Appl. No.: 14/832,316

(22) Filed: Aug. 21, 2015

(65) Prior Publication Data

US 2016/0062343 A1    Mar. 3, 2016

(30) Foreign Application Priority Data

Aug. 27, 2014 (JP) ................. 2014-172717

(51) Int. Cl.
*G06F 19/00* (2018.01)
*G05B 19/12* (2006.01)

(52) U.S. Cl.
CPC .... *G05B 19/12* (2013.01); *G05B 2219/31095* (2013.01); *G05B 2219/36364* (2013.01)

(58) Field of Classification Search
None
See application file for complete search history.

(56) References Cited

U.S. PATENT DOCUMENTS

| 4,920,422 A | * | 4/1990 | Lapierre | ............ B41J 2/01 346/2 |
| 2005/0257659 A1 | | 11/2005 | Yeh | |

FOREIGN PATENT DOCUMENTS

| CN | 200948536 Y | 9/2007 |
| CN | 101060956 A | 10/2007 |
| JP | 5-39837 U | 5/1993 |
| JP | 5-154732 A | 6/1993 |
| JP | H06-000632 U | 1/1994 |
| JP | H06-005076 Y2 | 2/1994 |
| JP | 7-3933 U | 1/1995 |
| JP | 2005-224896 A | 8/2005 |

* cited by examiner

*Primary Examiner* — Calvin Y Choi
(74) *Attorney, Agent, or Firm* — Hauptman Ham, LLP

(57) ABSTRACT

A tool information read/write device capable of being used in an automatic tool changer to which a conventional tool information read/write device cannot be applied, and a machine tool having the tool information read/write device. The read/write device has an arm section attached to a turret support part; a base section attached to the arm section; a slide section arranged on the base section so as to be linearly moved; a read/write head section attached to the slide section and configured to read/write information to a data carrier of a tool held by the turret; a drive section which drives the slide section so that the slide section reciprocates between a read/write position and an evacuation position; and a control section which controls the drive section in conjunction with a motion of the automatic tool changer.

6 Claims, 6 Drawing Sheets

TOOL INFORMATION READ/WRITE DEVICE AND MACHINE TOOL HAVING THE SAME

RELATED APPLICATIONS

The present application claims priority to Japanese Application Number 2014-172717, filed Aug. 27, 2014, the disclosure of which is hereby incorporated by reference herein in its entirety.

BACKGROUND OF THE INVENTION

1. Field of the Invention

The present invention relates to a device for reading/writing information of a tool with a data carrier used in a machine tool, and in particular, relates to a device for reading/writing information of the data carrier of the tool held by an automatic tool changer of the machine tool, and the machine tool having the device.

2. Description of the Related Art

A read/write device of tool information is used to read/write tool information (or tool data) stored in a data carrier provided to a tool contained in an automatic tool changer of a machine tool. The tool information includes a tool number, a tool diameter, a tool length and a life counter, etc. After the tool is contained in the automatic tool changer, the tool information read by the read/write device is automatically transmitted to and stored in an NC device. By virtue of this, man-hour can be reduced and input errors can be prevented, in comparison to manual data input.

In order to read/write tool data in the automatic tool changer, it is necessary to precisely position a read/write head of the tool information read/write device relative to the data carrier of the tool. This is because a distance between the data carrier and the read/write head and an allowable range of the deviation between center positions thereof are limited, in order to stably communicate between the read/write head and an IC chip used as the data carrier, etc.

As relevant prior art documents, JP H06-005076 Y discloses a read/write device of tool information used in a tool magazine device in which a pot containing a tool is driven by a chain. This document describes that: a member, which contacts a V-groove of the tool and limits a positional deviation the tool in the axial direction thereof, is positioned in an opening of an arm into which the circumference of the V-groove of the tool is inserted; a key, having a guide surface for limiting a positional deviation in the rotational direction of the tool, is fitted with a drive key groove of the opening of the arm; and a data carrier of the tool can be correctly positioned relative to the read/write head due to the member and the key.

Further, JP H06-000632 U discloses a tool information reader used in a chain-driven automatic tool changer. Concretely, this document describes that: a first base arranged on a bracket fixed to the tool changer so that the first base is movable in a first direction parallel to an axis of a tool holder; a second base and a drive unit are arranged on the first base so that the second base is moved by the drive unit in a second direction perpendicular to the axis of the tool holder; a third base is arranged on the second base so that the third base is movable in a third direction perpendicular to both the first and second directions; a pair of guide sections are arranged on the third base so that the pair of guide sections fit with radial ends of the tool holder when the guide sections are moved in the second direction; and a reading head is arranged between the pair of guide sections. This document also describes that the reading head can be correctly positioned on a predetermined position of the tool holder, even when a stop position of the tool holder of the tool changer has dispersion.

In the tool information read/write device (or reader) used in the chain-driven tool changer as described above, the position of the data carrier of the tool and the position of the read/write head may be deviated from each other, due to the influence of gap between a chain and a sprocket wheel. In order to solve this problem, in JP H06-005076 Y, the arm having the read/write head is held at a neutral position by a spring, and the circumference of the V-groove for gripping of the tool is used as a guide section for adjusting the positional relationship between the data carrier of the tool and the read/write head. However, when a tool changer, such as a turret, utilizing the V-groove of the tool, is used, the read-write device may interfere with a tool holding structure of the turret. Therefore, the read/write device as disclosed in JP H06-005076 Y cannot be used in the turret-type automatic tool changer.

The turret can rotate about a rotation axis thereof and also can swing about a swing axis due to an up-and-down motion of a spindle head. Therefore, even when the read/write device can be positioned without occurring interference, the read/write device cannot be correctly positioned relative to the position of the data carrier of the tool so that the read/write head can carry out read/write process.

In the prior art, since the read/write device can be applied to only a machine tool in which an automatic tool changer and a processing room are separated from each other, it is not necessary to consider that machining dust generated during the processing is adhered to the read/write head. However, since the turret-type automatic tool changer is usually positioned in the processing room, the machining dust generated during the processing may be adhered to the read/write head and the reading/writing of the data may be hindered.

On the other hand, the invention of JP H06-000632 U is intended to solve a problem due to slackening or elongation of the chain of the chain-type tool changer, and thus the above problem regarding the turret-type tool changer, not the chain-type tool changer, cannot be solved.

SUMMARY OF THE INVENTION

Thus, the object of the present invention is to provide a tool information read/write device capable of being used in an automatic tool changer to which a conventional tool information read/write device cannot be applied, and a machine tool having the tool information read/write device.

One aspect of the present invention provides a tool information read/write device for reading/writing information stored in a data carrier of a tool held by an automatic tool changer and positioned to a predetermined position, the tool information read/write device comprising: an arm section attached to the automatic tool changer; a base section attached to the arm section; a slide section arranged on the base section so as to be linearly moved; a read/write head section attached to the slide section and configured to read/write information to the data carrier; a drive section which drives the slide section so that the slide section reciprocates between a read/write position where the read/write head reads or writes the information of the data carrier of the tool positioned at the predetermined position, and an evacuation position which is backwardly separated from the read/write position; and a control section which controls the drive section in conjunction with a motion of the automatic tool changer.

In a preferred embodiment, the tool information read/write device further comprises an adjustment mechanism between the base section and the arm section, the adjustment mechanism being configured to adjust and fix a position and orientation of the base section relative to the arm.

In a preferred embodiment, the tool information read/write device further comprises a head cleaning unit which injects fluid so as to clean the read/write head section.

Another aspect of the present invention provides a machine tool comprising: a spindle; a turret-type automatic tool changer for automatically exchanging a tool between the spindle and the tool changer; and the tool information read/write device of the invention, wherein the tool information read/write device reads or writes the information stored in the data carrier of the tool positioned at the predetermined position by indexing motion of a turret of the automatic tool changer.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
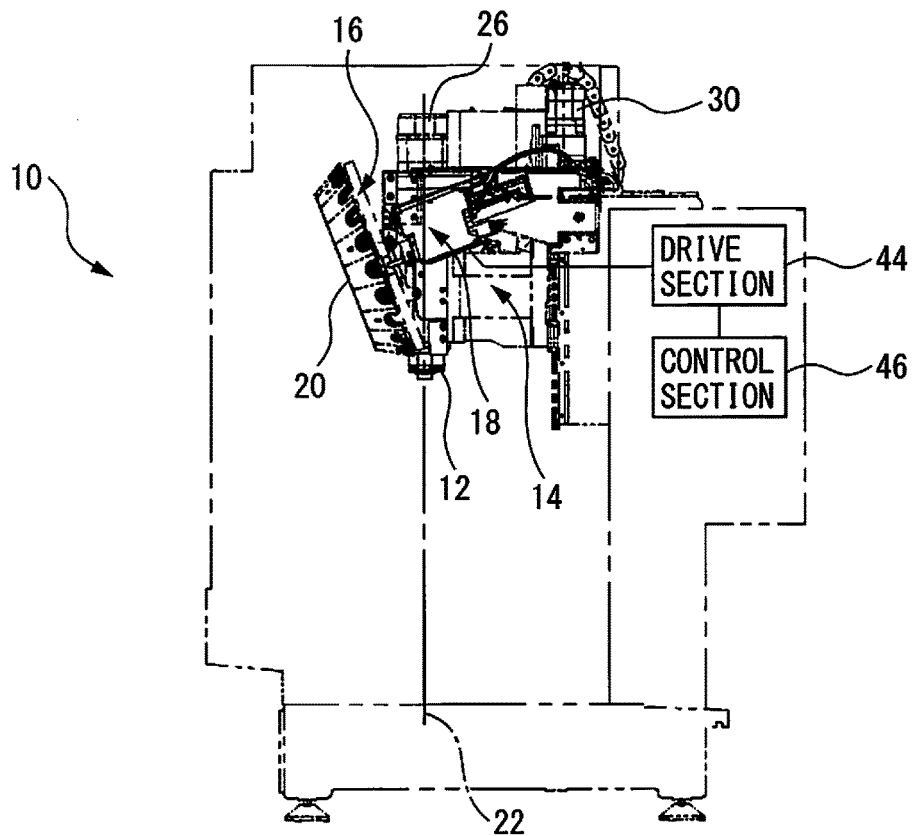
FIG. 1 is a schematic view of a machine tool having a tool information read/write device according to an embodiment of the present invention.

FIG. 1 is a schematic view of a machine tool having a tool information read/write device according to a preferred embodiment of the present invention. Machine tool 10, an outline of which is schematically indicated by a two-dot chain line, has a spindle 12 configured to grip a tool for processing an object to be processed (not shown); a spindle head 14 which rotatably supports spindle 12; an automatic tool changer 16 which automatically exchanges the tool of spindle 12; and a tool information read/write device (hereinafter, also referred to as merely a "read/write device") 18 which reads or writes tool information of the tool held by automatic tool changer 16.

In the embodiment of FIG. 1, automatic tool changer 16 is a turret-type automatic tool changer having a turret 20, and a plurality of grippers 19 are arranged (usually at regular intervals) on a circumference of turret 20. By indexing motion of turret 20, a desired tool held by gripper 19 can be positioned at a predetermined exchange position, and the positioned tool can be exchanged for a tool held by spindle 12.

Figure 2:
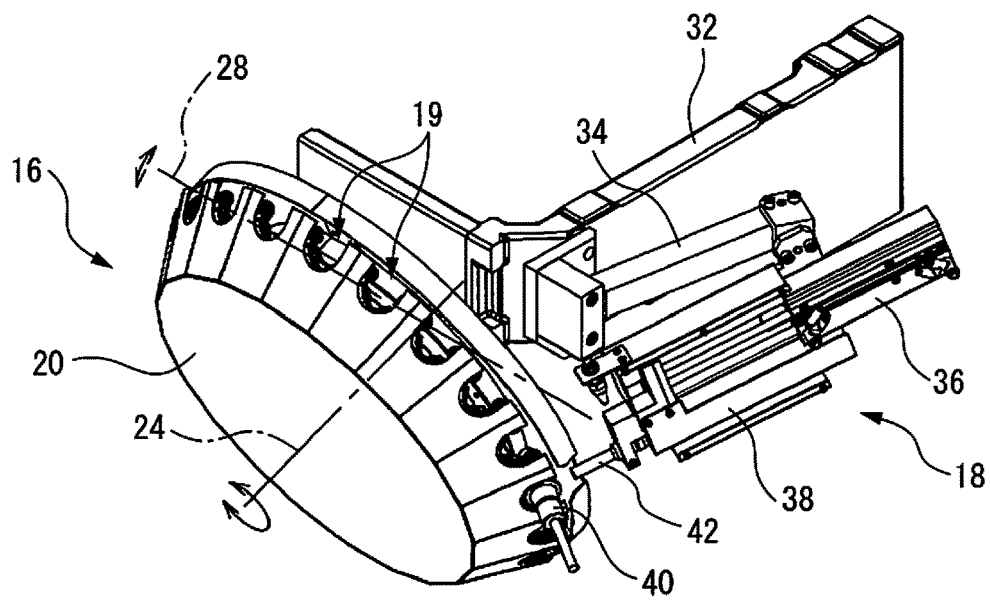
FIG. 2 is an enlarged view of a turret and the tool information read/write device.

As shown in FIG. 1, machine tool 10 may have a motor 26 for rotating spindle 12 about a spindle rotation axis 22 and for rotating turret 20 about a turret rotation axis 24 (FIG. 2). However, a motor for rotating the spindle and a motor for rotating the turret may be separately arranged in the machine tool. Further, machine tool 10 may have a motor 30 for moving spindle head 14 upward and downward (or in the vertical direction) and for swinging turret 20 about a turret swing axis 28. However, a motor for moving the spindle head in the vertical direction and a motor for swinging the turret may be separately arranged in the machine tool. For example, servomotors may be used for the above motors. Since another part of machine tool 10 other than the above mentioned components may be conventional, a detailed explanation thereof will be omitted.

Figure 3:
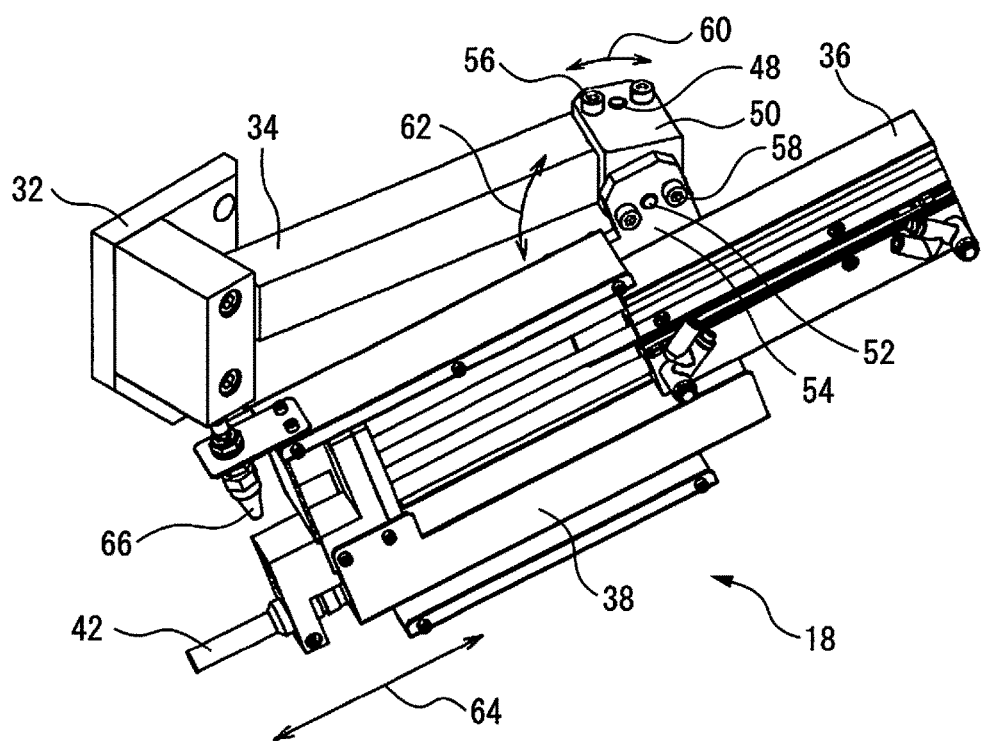
FIG. 3 is a view of a structure of the tool information read/write device.

FIG. 2 is a view of automatic tool changer 16 and read/write device 18, and FIG. 3 is a view of a detail of a major part of read/write device 18. Read/write device 18 has an arm section 34 attached to automatic tool changer 16 (in the embodiment of FIG. 2, a turret support part 32 for supporting turret 20); a base section 36 attached to arm section 34; a slide section 38 arranged on base section 36 so as to be linearly moved; and a read/write head section 42 attached to slide section 38 and configured to read/write information to a data carrier of a tool 40 held by turret 20.

Further, read/write device 18 has a drive section (for example, a servomotor or an electromagnetic solenoid) 44 which drives slide section 38 so that slide section 38 reciprocates between a read/write position where read/write head 42 reads or writes the information of the data carrier of the tool positioned at the predetermined position, and an evacuation position which is backwardly separated from the read/write position; and a control section 46 which controls drive section 44 in conjunction with a motion of automatic tool changer 16 (FIG. 1). In addition, a controller of machine tool 10 may have the function of control section 46.

In the turret-type automatic tool changer as shown in FIG. 1, the indexed position of turret 20 in the rotational direction thereof is highly reproducible in comparison to a chain-driven tool changer, and thus it is less necessary to arrange a means to automatically and finely adjust the position of read/write head 42 in the rotational direction of the turret. However, it is necessary to prevent read/write device (in particular, head section 42) from interfering with the tool or turret 20 when the tool is attached or removed or when turret 20 is swung or rotated. Therefore, in the present invention, a linearly-movable structure (or slide section 38) for moving read/write head 42 forward and backward is arranged so that read/write head 42 can be positioned at the evacuation position when read/write operation is not carried out. Accordingly, in the present invention, the read/write device capable of avoiding interference with the turret, etc., can be realized by using a simple structure.

On the other hand, when arm section 34 is attached to (turret support part 32 of) automatic tool changer 16, the position of read/write head section 42 arranged at a front end of read/write device 18 may be deviated from the position of tool 40 having the data carrier. Since a range of allowable error of this positional relationship (or the position of head section 42 relative to tool 40) is relatively small, it is preferable that an initial position of head section 42 (or base section 36) be adjustable. Hereinafter, a mechanism for adjusting the initial position of head section 42 will be explained.

As shown in FIG. 3, between arm section 34 and base section 36, an adjustment mechanism, for finely adjusting and fixing the position of base section 36 relative to arm section 34 in the horizontal and vertical directions, is arranged. Concretely, a first bracket 50 rotatable about a first pin 48 extending in the generally vertical direction is attached to one end of arm section 34 opposite to another end of arm section 34 fixed to turret support part 32, a second first bracket 54 rotatable about a second pin 52 extending in the generally horizontal direction is attached to first bracket 50, and second bracket 54 is fixed to base section 36. Further, first bracket 50 can be fixed to arm section 34 by at least one (two in the illustrated embodiment) first fixing bolt 56, and second bracket 54 can be fixed to first bracket 50 by at least one (two in the illustrated embodiment) second fixing bolt 58.

By virtue of the above adjustment mechanism, the position and orientation of base section 36 relative to arm section 34 can be adjusted and fixed in both the generally horizontal direction indicated by an arrow 60 and the generally vertical direction indicated by an arrow 62. Since slide section 38 can be linearly moved relative to base section 36 (in the illustrated embodiment, in the direction indicated by an arrow 64), when the initial position and orientation of base section 36 are appropriately adjusted, read/write head section 42 can be correctly moved to a read/write position, while preventing head section 42 from interfering with turret 20, etc.

In machine tool 10, machining dust generated during the processing may be adhered to read/write head section 42, which may hinder reading/writing process of the data.

In this regard, as shown in FIG. 3, it is preferable that read/write device 18 have a head cleaning unit 66 which injects fluid such as compressed air or coolant so as to clean head section 42. The location and structure of head cleaning unit 66 may be arbitrarily determined as long as the cleaning unit can inject fluid and clean head section 42. In FIG. 3, head cleaning unit 66 is illustrated as a nozzle attached to an end of base section 36. In this case, nozzle 66 is positioned so that the fluid injected from nozzle 66 contacts a front end of head section 42 while head section is moved forward from an evacuation position to a read/write position. Due to such a configuration, the machining dust adhered to head section 42 is removed when the head section reaches the read/write position, whereby the reading/writing process of the data can be stably carried out.

Next, with reference to a flowchart of FIG. 4, a first example of a tool information read/write operation by using the read/write device according to the present invention will be explained. In the first example, the read/write operation regarding tool information of one tool positioned at the read/write position is explained.

First, in step S11, it is judged as to whether or not an operating condition regarding the read/write operation is satisfied. In this regard, the operating condition means that the indexing (rotating) motion of turret 20 is completed and turret 20 is positioned at a predetermined position regarding the swinging motion thereof. The operating condition can be automatically checked by a controller, etc., of machine tool 10. When the operating condition is not satisfied, a message representing this check result (for example, "operating condition is NG") is displayed on a display, etc., of the machine tool (step S12), so that an operator can take appropriate measures. By virtue of this, the position of read/write head section 42 can be controlled in conjunction with the motion of tool changer 16 so that the read/write operation can be carried out while tool 40 is fixed. Therefore, the positional relationship between the data carrier of the tool and the read/write head section can be set to a positional relationship required for the read/write operation.

When the operating condition is satisfied in step S11, read/write head section 42 is moved to the read/write position. Concretely, head cleaning unit 66 is activated (or fluid is injected from the nozzle) (step S13), read/write head section 42 is moved from the evacuation position to the read/write position (step S14), and then head cleaning unit 66 is stopped when head section 42 reaches the read/write position (step S15). Although steps S13 and S15 are not essential, head section 42 in a clean condition can be moved to the read/write position due to steps S13 and S15.

Figure 5:
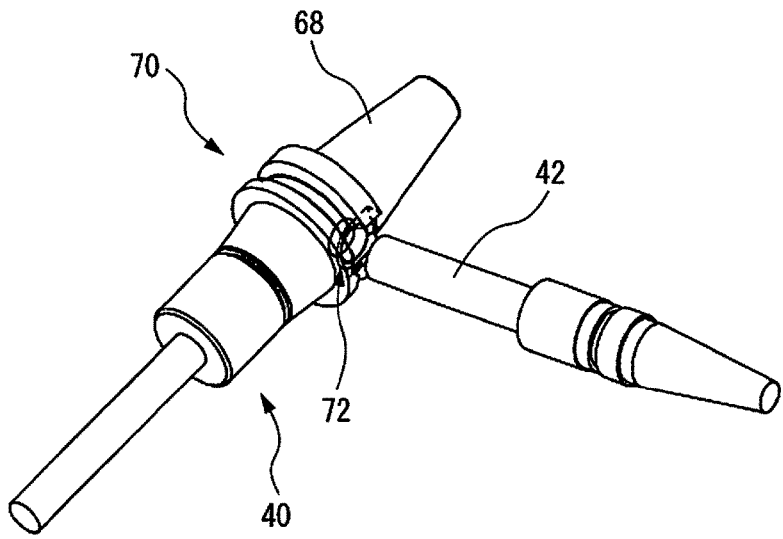
FIG. 5 is a view of a head section of the tool information read/write device and a tool having a data carrier storing tool information to be read by the head section.

FIG. 5 shows read/write head section 42 and tool 40 with a data carrier held by the turret when head section 42 is positioned at the read/write position. In the illustrated embodiment, tool 40 has a taper shank 68 attached to spindle 12 of machine tool 10 (FIG. 1), a V-groove (or a key slot) 70 used to grip the tool, and a data carrier 72 such as an IC tag or barcode positioned in key slot 70 (in the illustrated embodiment, at a bottom surface of a counterbore formed on a part of key slot 70). When read/write head section 42 approaches data carrier 72, the data stored in data carrier 72 can be read or written in a non-contact manner.

Then, by using read/write head section 42, a tool number of the tool positioned at the read/write position is checked (step S16), and tool information stored in data carrier 72 is read or written (step S17). The tool information to be read or written may include a tool number, a tool diameter, a tool length and a life counter, etc. Since the tool information may be conventional, a detailed explanation thereof will be omitted.

Finally, after the read/write operation of the tool information is completed, read/write head section 42 is moved backward to the evacuation position (step S18), and the series of process is terminated.

Figure 6:
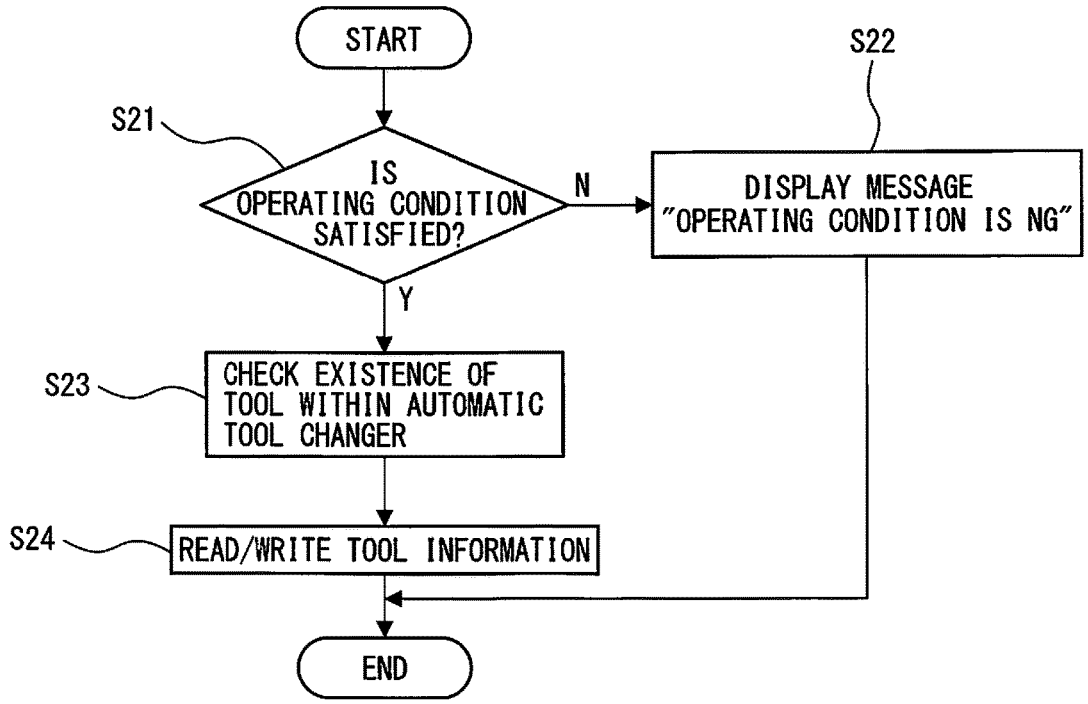
FIG. 6 is a flowchart showing a second example of tool information read/write operation by using the tool information read/write device of the invention.
Figure 7:
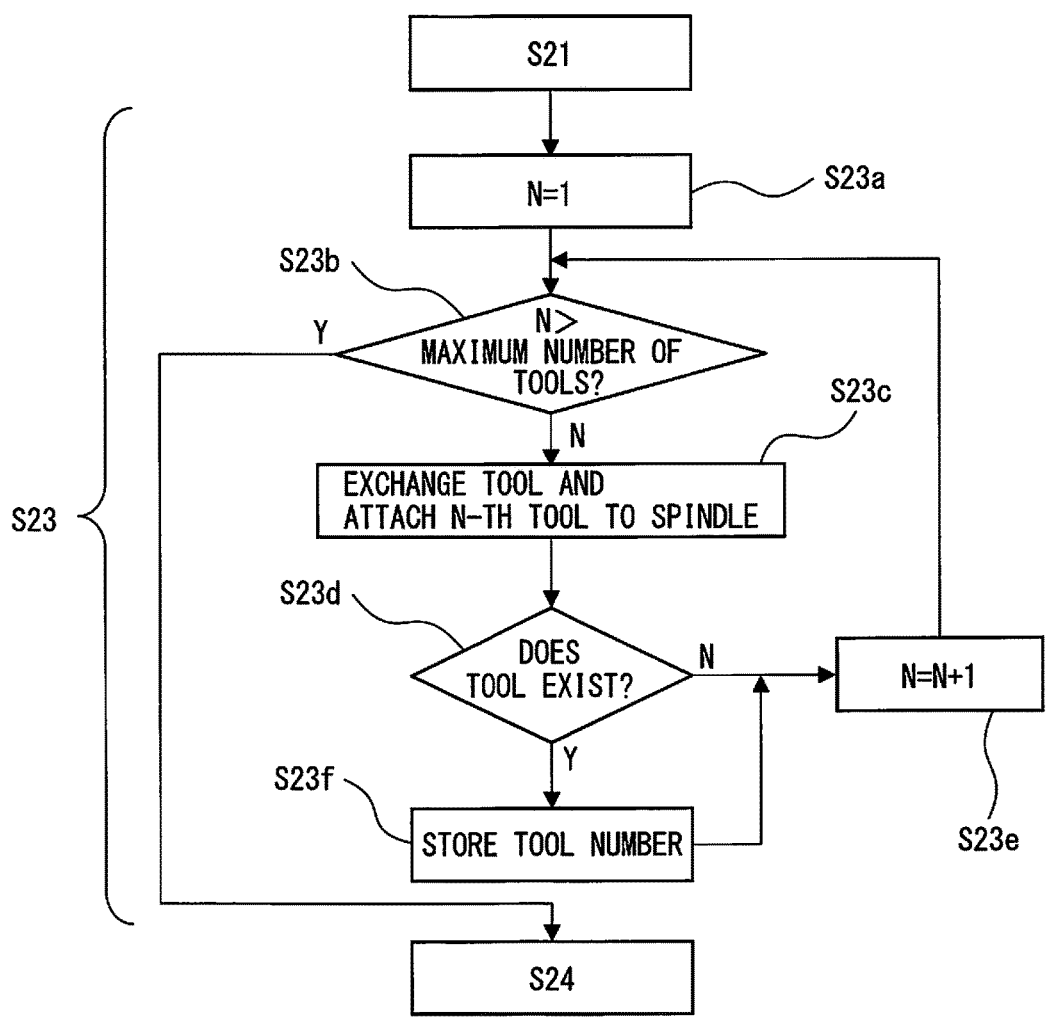
FIG. 7 is a flowchart showing a detail of the process in the flowchart of FIG. 6 regarding checking existence of the tool.
Figure 8:
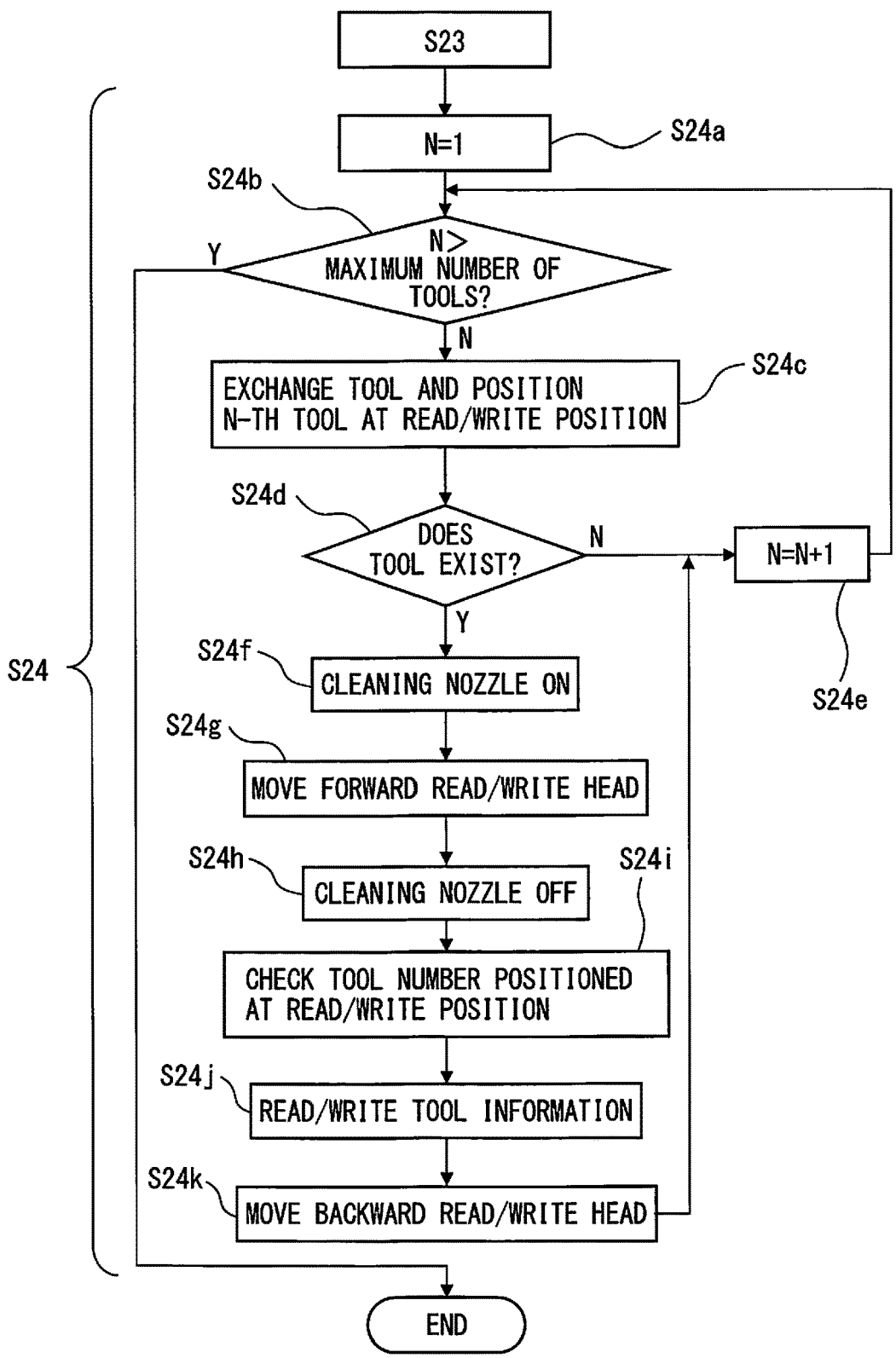
FIG. 8 is a flowchart showing a detail of the process in the flowchart of FIG. 6 regarding reading/writing of the tool information.

Next, with reference to flowcharts of FIGS. 6 to 8, a second example of a tool information read/write operation by using the read/write device according to the present invention will be explained. In the second example, the read/write operation for collectively reading/writing tool information of all of the tools held by automatic tool changer 16 (turret 20) is explained.

Figure 4:
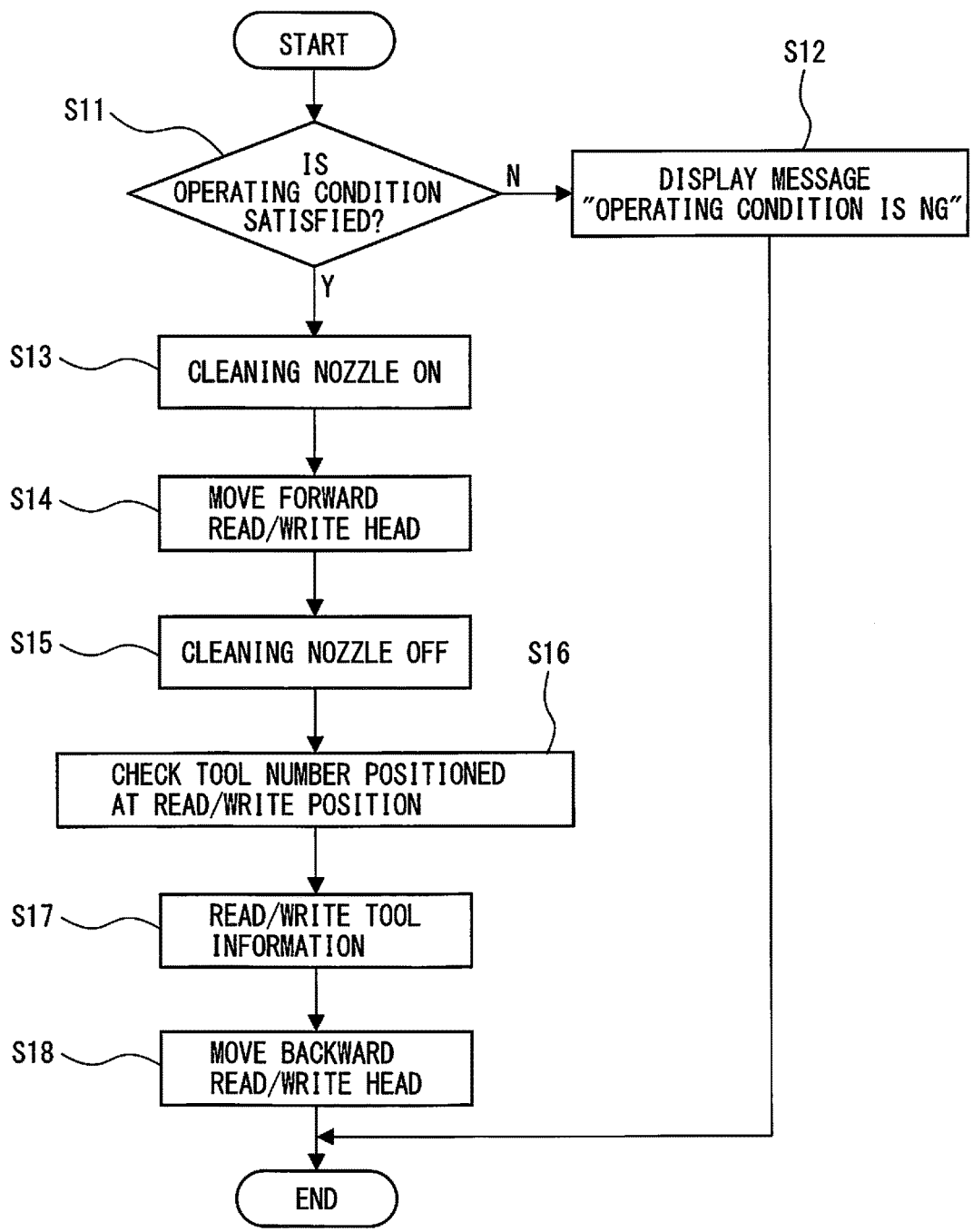
FIG. 4 is a flowchart showing a first example of tool information read/write operation by using the tool information read/write device of the invention.

First, in step S21, similarly to step S11 in FIG. 4, it is judged as to whether or not the operating condition regarding the read/write operation is satisfied. When the operating condition is not satisfied, a message representing this check result (for example, "operating condition is NG") is displayed on a display, etc., of the machine tool (step S22), so that the operator can take appropriate measures.

When the operating condition is satisfied in step S21, it is checked as to whether each tool exists in automatic tool changer 16 (step S23). Hereinafter, a detail of step S23 will be explained with reference to FIG. 7.

First, in step S23*a*, "1" is assigned to a variable "N," and in the next step S23*b*, number "N" is compared to a predetermined maximum number of tools (usually, a maximum number of tools capable of being held by turret 20). When number "N" is not more than the maximum number, tool exchange operation is carried out between a tool positioned at an N-th position of the turret and a tool held by the spindle (step S23*c*).

In this regard, in case that a tool is not positioned at N-th position of the turret, the tool will not be attached to the spindle even when the tool exchange operation is carried out. Therefore, in the next step S23d, it is detected as to whether or not the tool is attached to the spindle, by using a suitable sensor, etc. If the tool is not attached to the spindle, number "N" is increased (or incremented) by one (step S23e), and the procedure is returned to step S23b. On the other hand, if the tool is attached to the spindle, a tool number of the tool attached to the spindle is stored in the NC device, etc., of the machine tool (step S23f), and the procedure progresses to step S23e.

By repeating the above procedure until number "N" exceeds the maximum number of tools, it can be recognized as to which gripper (or holder) of the turret hold the tool, and further, the tool number of each of held tools can be recognized.

Next, with reference to FIG. 8, a detail of step S24 will be explained. First, in step S24a, "1" is assigned to a variable "N," and in the next step S24b, number "N" is compared to a predetermined maximum number of tools. When number "N" is not more than the maximum number, tool exchange operation is carried out between a tool attached to the spindle and a tool held by the turret by using the tool changer, and the tool is positioned as an N-th tool at a position where read/write device 18 can carry out the read/write operation (step S24c).

In this regard, in case that a tool is not attached to the spindle, the tool will not exist at the read/write position even when the tool exchange operation is carried out. Therefore, in the next step S24d, it is detected as to whether or not the tool exists at the read/write position, by using a suitable sensor, etc. If the tool does not exist at the read/write position, number "N" is increased (or incremented) by one (step S24), and the procedure is returned to step S24b.

On the other hand, if the tool exists at the read/write position, a procedure similar to steps S13 to S18 in the first example of FIG. 4 is carried out. Concretely, head cleaning unit 66 is activated (or fluid is injected from the nozzle) (step S24f), read/write head section 42 is moved from the evacuation position to the read/write position (step S24g), and then head cleaning unit 66 is stopped when head section 42 reaches the read/write position (step S24h).

Next, by using read/write head section 42, a tool number of the tool positioned at the read/write position is checked (step S24i), and tool information stored in data carrier 72 is read or written (step S24j). Then, after the read/write operation of the tool information is completed, read/write head section 42 is moved backward to the evacuation position (step S24k), and the procedure progresses to step S24e.

By virtue of the procedure explained with reference to FIGS. 6 to 8, the tool information of the plurality of tools held by the turret can be collectively read or written. In this regard, although tool exchange operation is carried out between the turret and the spindle in steps S23 and S24, this tool exchange operation may not be carried out. In other words, indexing motion may be carried out so that a plurality of grippers of the turret are sequentially positioned at the read/write position, and then, by moving forward the head section of the read/write device to the read/write position when each gripper is positioned at the read/write position, the read/write operation regarding the data carrier of the tool can be carried out when the tool is held by the gripper positioned at the read/write position.

As described above, the read/write device of the present invention can carry out tool information read/write operation regarding one tool held by the automatic tool changer, or can collectively carry out tool information read/write operation regarding a plurality of tools held by the automatic tool changer.

According to the present invention, even when a machine tool has a device such as a turret-type automatic tool changer which is likely to interference with other components, there is provided a tool information read/write device capable of correctly reading/writing tool information without interference, while the read/write device has a simple configuration without a spring or guide mechanism. Further, since the read/write device can automatically read/write the tool information, a time required for manually registering data in an NC device can be reduced, and data input errors can be avoided.

By arranging a mechanism capable of finely adjusting the initial position of the read/write head section, the read/write operation can be carried out more precisely.

By using a head cleaning unit, an adverse effect on reading/writing data, due to machining dust generated during processing and adhered to the read/write head section, can be avoided.

By applying the read/write device of the present invention to a machine tool having a turret-type automatic tool changer, the read/write device can correctly read/write the tool information without interference with the turret, etc.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A tool information read/write device for reading/writing information stored in a data carrier of a tool held by an automatic tool changer and positioned to a predetermined position, the tool information read/write device comprising:
    an arm section attached to the automatic tool changer;
    a base section attached to the arm section;
    a slide section arranged on the base section so as to be linearly moved;
    an adjustment mechanism between the base section and the arm section, the adjustment mechanism being configured to adjust and fix a position and orientation of the base section relative to the arm section:
    a read/write head section attached to the slide section and configured to read/write information to the data carrier;
    a drive section which drives the slide section so that the slide section reciprocates between
        a read/write position where the read/write head reads or writes the information of the data carrier of the tool positioned at the predetermined position, and
        an evacuation position which is backwardly separated from the read/write position; and
    a control section which controls the drive section in conjunction with a motion of the automatic tool changer.

2. The tool information read/write device as set forth in claim 1, further comprising a head cleaning unit which injects fluid so as to clean the read/write head section.

3. A machine tool, comprising:
    a spindle;
    an automatic tool changer having a turret for automatically exchanging a tool between the spindle and the tool changer; and
    the tool information read/write device as set forth in claim 1,
    wherein the tool information read/write device reads or writes the information stored in the data carrier of the tool positioned at the predetermined position by indexing motion of the turret of the automatic tool changer.

4. The tool information read/write device as set forth in claim 1,
wherein the read/write device reads and writes, on the data carrier, tool information regarding a tool held by the automatic tool changer.

5. The tool information read/write device as set forth in claim 1,
wherein the read/write device reads and writes, on the data carrier, tool information regarding a plurality of tools held by the automatic tool changer.

6. The tool information read/write device as set forth in claim 1,
wherein the slide section is arranged directly on the base section so as to be linearly moveable in parallel with an upper surface of the base section.

\* \* \* \* \*